United States Patent Office 3,657,271
Patented Apr. 18, 1972

3,657,271
1,3-DIMETHYL-5-METHYLAMINO-8-PHENYL-PYRAZOLO[4,3-e][1,4]DIAZEPINE
Leo Ralph Swett, Waukegan, Ill., assignor to Abbott Laboratories, Chicago, Ill.
No Drawing. Filed June 22, 1970, Ser. No. 48,480
Int. Cl. C07d 57/02
U.S. Cl. 260—310 R         3 Claims

ABSTRACT OF THE DISCLOSURE 1,3-dimethyl-5-methylamino - 8 - phenylpyrazolo[4,3-e][1,4]diazepine and its method of preparation. The compound exhibits anti-inflammatory activity.

DETAILED DESCRIPTION OF THE INVENTION

A number of humans and animals are known to suffer from various rheumatic conditions involving inflammation, swelling, tenderness, decrease mobility, pain and fever. While there are a number of presently available anti-inflammatory agents which have been found to be effective in the symptomatic treatment of conditions such as rheumatoid arthritis, rheumatoid, spondylitis and degenerative joint disease (osteoarthritis) of the hip, such agents exhibit various undesirable side effects. Thus, the search for improved anti-inflammatory agents continues. The present invention provides a novel compound which exhibits anti-inflammatory activity.

The novel compound of this invention 1,3-dimethyl-5-methylamino - 8 - phenylpyrazolo[4,3-e][1,4]diazepine is represented by the structural formula

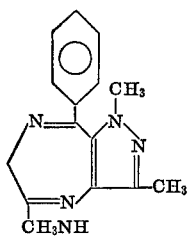

The compound of this invention is an excellent anti-inflammatory agent having an oral $ED_{25}$ of 35 mg./kg. in the carrageenan rat paw edema test [Winter et al., Proc. Soc. Exp. Biol. Med. 111, 544 (1962)]. The oral $LD_{50}$ of the compound is greater than 500 mg./kg. in rats. Generally speaking, the compound is administered to patients in dosages of from 7 to 100 mg./kg. of body weight daily, preferably in divided doses. It is presently preferred that from 500 to 1000 mg. of the compound be administered daily to patients suffering from various inflammatory diseases such as rheumatoid arthritis and the like, preferably in divided doses of, for example, 250 mg. two to four times a day.

1,3-dimethyl-5-methylamino - 8 - phenylpyrazolo[4,3-e][1,4]diazepine can be conveniently prepared from 1,3-dimethyl-4-nitro-5-pyrazolecarboxylic acid by methods well known in the art. Generally speaking, 1,3-dimethyl-4-nitro-5-pyrazolecarboxylic acid is converted to 4,6-dihydro-1,3-dimethyl - 8 - phenylpyrazolo[4,3-e][1,4]diazepine 5(1H)one following the method described by Archer and Sternback, J. Org. Chem. 29, 231 (1964); that is by converting the compound into the corresponding thione by treatment with phosphorus pentasulfide, converting the thione to the corresponding methylmercapto compound by treatment with, for example, methylhalide or dimethylsulfate, and reacting the methylmercapto compound with methylamine to obtain the desired product.

The preferred synthetic route for the preparation of the novel diazepine of this invention is represented by the following reaction scheme:

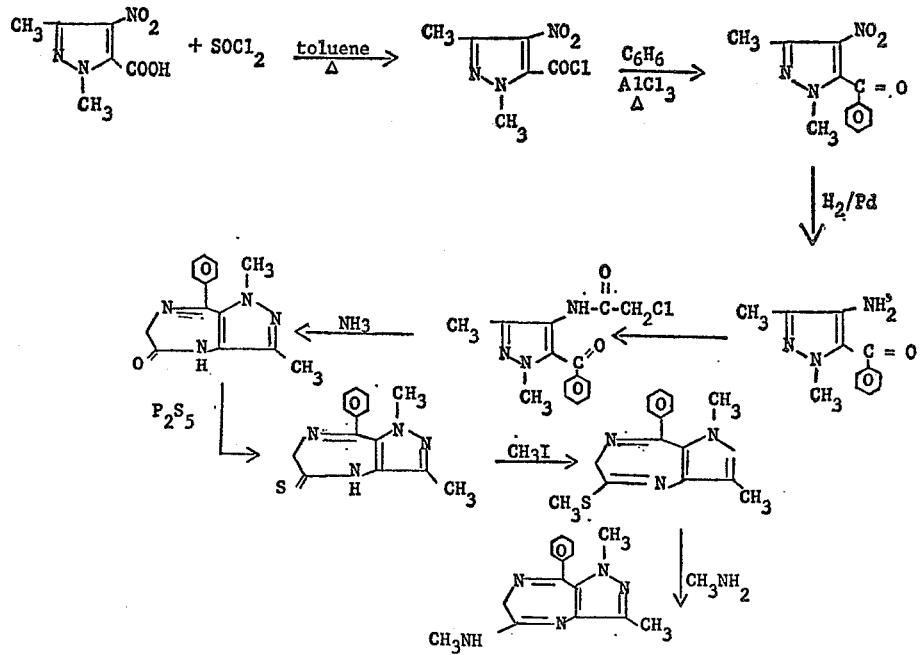

*Example.*—Preparation of 1,3-dimethyl-5-methylamino-8-phenylpyrazolo[4,3-e][1,4]diazepine (A) 5-benzoyl-1,3-dimethyl-4-nitropyrazole.—111 g. of 1,3-dimethyl-4-nitro-5-pyrazolecarboxylic acid, prepared according to the method of Papesch & Dodson, J. Org. Chem. 30, 199 (1965), was suspended with stirring, in 1 l. of boiling toluene and treated with 42 g. of thionyl chloride. The reaction mixture was refluxed with stirring overnight. The reaction mixture was then filtered to remove the insoluble material, and the filtrate was concentrated to a residue in vacuo. The residue was taken up in 1 l. of hot Skelly B whereupon the corresponding acid chloride separated as an oil. The acid chloride (65.0 g.), M.P. 43–46°, crystallized upon scratching and chilling.

363 g. of aluminum chloride was suspended in 800 ml. of benzene. To the aluminum chloride suspension was added portionwise 800 ml. of benzene containing 231 g. of the acid chloride, prepared as described above, over a period of approximately 1.5 hours. The reaction mixture was refluxed, with stirring, for 4.5 hours and allowed to stand at room temperature overnight. The decanted benzene layer was added to 3800 ml. of water containing 480 ml. of concentrated HCl. The residue in the reaction flask was decomposed by the addtiion of dilute HCl. The residual tarry material was removed by suction filtration, the layers were separated and the aqueous layer was extracted several times with benzene. The benzene extracts were combined, washed with 1 l. of water, 1 l. of a 10% NaOH solution, and then washed 3 times with 500 ml. portions of water. The combined, washed benzene extracts were dried over anhydrous magnesium sulfate, and the benzene was removed on a rotary evaporator to yield 152.9 g. of crude residue. The residue was crystallized by dissolution in 500 ml. of benzene, with warming, filtration and dilution of the chilled filtrate with approximately 1200 ml. of pentene. The filtrate was then chilled, scratched and seeded with a crystal of the pure nitro ketone and dried to yield 99.8 g. of yellow-orange crystals of 5-benzoyl-1,3-dimethyl-4-nitropyrazole, M.P. 62–63°.

(B) 4,6-dihydro-1,3-dimethyl-8-phenyl-pyrazolo[4,3-e] [1,4]diazepine 5(1H)one.—A solution of 81.6 g. of the above obtained 5-benzoyl-1,3-dimethyl-4-nitropyrazole in 1000 ml. of ethyl alcohol (absolute) containing 85 drops of pyridine was hydrogenated at 60° in the presence of 7.3 g. of 6% palladium on charcoal for approximately 4½ hours. The reaction mixture was cooled, filtered from the catalyst, and washed and the solvent removed to yield 4-amino-5-benzoyl-1,3-dimethylpyrazole as an oil.

46 g. of the 4-amino-5-benzoyl-1,3-dimethylpyrazole was dissolved in 500 ml. of acetic acid with stirring. To the resulting deep reddish-brown solution was added dropwise 60.6 g. of bromoacetylbromide over a 10 minute period. The reaction temperature was maintained below 30° during the bromide addition, at which time the reaction mixture was a light orange color. The mixture was stirred at room temperature for 1 hour whereupon a precipitate formed. The reaction was allowed to stand overnight. The solid was then scraped onto a sintered glass filter and dried. The dried solid was added to water whereupon the material partially dissolved and then reprecipitated. The precipitate was filtered, washed three times with water and dried to yield 45.3 g. of 1,3-dimethyl-4-bromoacetamido - 5 - benzoylpyrazole, M.P. 172–173.5°. The acetic acid filtrate was worked up to yield an additional 4.7 g. of product, M.P. 169–171° (benzene).

50.0 g. of 1,3-dimethyl-4-bromoacetamido-5-benzoyl-pyrazole, obtained as above described, was added portionwise to 2000 ml. of liquid ammonia. The reaction mixture was stirred and the ammonia allowed to evaporate. The reaction mixture was then warmed on a steam bath to evaporate the excess ammonia. Water was added to the resulting viscous gem, the mixture was allowed to stand for 15 minutes, and the resulting precipitate was filtered, washed two times with water, and dried in vacuo at 70°. The crude product was recrystallized from methanol to yield 29.5 g. of 4,6-dihydro-1,3-dimethyl-8-phenyl-pyrazolo[4,3-e][1,4]diazepine 5(1H)one, M.P. 270–272°.

*Analysis.*—Calc. for $C_{14}H_{14}N_4$ (percent): C, 66.14; H, 5.51; N, 22.07. Found (percent): C, 66.17; H, 5.56; N, 22.25.

(C) 1,3-dimethyl-5-methylamino - 8 - phenylpyrazolo[4,3-e][1,4]diazepine.—5.08 g. of the above prepared 4,6-dihydro - 1,3 - dimethyl-8-phenylpyrazolo[4,3-e][1,4]diazepine 5(1H)one and 4.44 g. of phosphorus pentasulfide were combined in 100 ml. of pyridine and refluxed overnight with stirring. The reaction mixture was then cooled and concentrated to dryness. The residue was taken up in chloroform, washed twice with dilute $NH_4OH$ and three times with water, dried over $Mg.SO_4$, filtered and concentrated to dryness. The residue was triturated with ethanol, filtered, washed three times with ethanol and dried to yield 2.55 g. of the crude thione, M.P. 274–277° dec. The crude thione was recrystallized from methanol, filtered and dried in vacuo to yield 1.48 g. of yellow needles of 4,6-dihydro-1,3-dimethyl-8-phenylpyrazolo[4,3-e][1,4]diazepine 5-thione, M.P. 275–278 dec.

*Analysis.*—Calc. for $C_{14}H_{14}N_4S$ (percent): C, 62.22; H, 5.18; S, 11.85. Found (percent): C, 62.01; H, 5.21; S, 11.81.

2.7 g. of the thione, prepared as described above, was dissolved in 12 ml. of 1 N NaOH and 15 ml. of methanol with stirring. To the thione solution was added a solution of 1.39 g. of dimethylsulfate in 5 ml. of methanol. The reaction mixture was stirred at room temperature for 30 minutes, diluted with water and extracted with chloroform. The chloroform extract was washed two times with water, dried over $MgSO_4$, filtered and concentrated to dryness to yield an orange-yellow glassy residue. The residue was recrystallized from Skelly B to yield 2 g. of the corresponding 1,3-dimethyl-5-methylmercapto-8-phenylpyrazolo[4,3-e][1,4]diazepine, M.P. 106–109°.

*Analysis.*—Calc. for $C_{15}H_{16}N_4S$ (percent): C, 63.38; H, 5.91; N, 19.71. Found (percent): C, 63.58; H, 5.78; N, 19.90.

5.7 g. of the methylmercapto intermediate, prepared as described above, were dissolved in 60 ml. of ethanol and 10 ml. of dimethylsulfoxide. Methylamine gas was passed into the solution for 1 hour. The solution was refluxed gently during the methylamine addition and for 1½ hours thereafter. The reaction was subjected to methylamine gas for 8 hours, refluxed overnight and subjected to methylamine gas for an additional 8 hours. The reaction mixture was concentrated to dryness. The resulting gummy solid was taken up in water, the pH was adjusted to 4 with concentrated HCl, and the solution was extracted three times with ether. The combined ether extracts were dried over $MgSO_4$, filtered and concentrated to dryness. The solid was recrystallized from Skelly B to yield 1.54 g. of the methylmercapto starting material. The aqueous phase was made basic with dilute NaOH and extracted twice with chloroform. The chloroform extracts were washed twice with water, dried over magnesium sulfate, filtered and concentrated to dryness. The residue was recrystallized from acetone, filtered, washed twice with acetone and dried to yield 0.9 g. of 1,3-dimethyl-5-methylamino - 8 - phenylpyrazolo[4,3-e][1,4]diazepine, M.P. 218–221°.

*Analysis.*—Calc. for $C_{15}H_{17}N_5$ (percent): C, 67.42; H, 6.36; N, 26.22. Found (percent): C, 67.71; H, 6.49; N, 26.00.

4,6-dihydro-1,3-dimethyl - 8 - phenylpyrazolo[4,3-e][1,4]diazepine-5-thione and 1,3-dimethyl-5-methylmercapto-8 - phenylpyrazolo[4,3-e][1,4]diazepine are new compounds which are useful as intermediates in preparing the compound of this invention.

The present invention includes within its scope pharmaceutical compositions comprising, as an active ingredient, at least one of the compounds of this invention in association with a pharmaceutical carrier or diluent. The compounds of this invention exhibit both oral and parenteral activity and can be formulated in dosage forms for oral, parenteral, rectal or topical administration.

Solid dosage forms for oral administration include capsules, tablets, pills, powders and granules. In such solid dosage forms, the active compound is admixed with at least one inert diluent such as sucrose, lactose or starch. Such dosage forms can also comprise, as is normal practice, additional substances other than inert diluents, e.g., lubricating agents such as magnesium stearate. In the case of capsules, tablets and pills, the dosage forms may also comprise buffering agents. Tablets and pills can additionally be prepared with enteric coatings.

Liquid dosage forms for oral administration include, pharmaceutical acceptable emulsions, solutions, suspensions, syrups and elixirs containing inert diluents commonly used in the art, such as water. Besides inert diluents, such compositions can also include adjuvants, such as wetting agents, emulsifying and suspending agents, and sweetening, flavoring and perfuming agents.

Preparations according to this invention for parenteral administration include sterile aqueous or non-aqueous solutions, suspension or emulsions. Examples of non-aqueous solvents or vehicles are propylene glycol, polyethylene glycol, vegetable oils, such as olive oil and injectable organic esters such as ethyl oleate. Such dosage forms may also contain adjuvants such as preserving, wetting, emulsifying and dispersing agents. They may be sterilized by, for example, filtration through a bacteria-retaining filter, by incorporating sterilizing agents into the compositions, by irradiating the compositions, or by heating the compositions. They can also be manufactured in the form of sterile solid compositions which can be dissolved in sterile water, or some other sterile injectable medium immediately before use.

Compositions for rectal administration are suppositories which may contain in addition to the active substance, excipients such as cocoa butter or a suppository wax.

The dosage of active ingredient in the compositions of this invention may be varied; however, it is necessary that the amount of the active ingredient shall be such that a suitable dosage form is obtained. The selected dosage depends upon the desired therapeutic effect, on the route of administration, and on the duration of the treatment. Generally, dosage levels of between 7.5 to 500 mg./kg. of body weight daily are administered to mammals to obtain effective relief of inflammation, and the concomitant pain, fever, etc.

I claim:
1. A compound of the formula

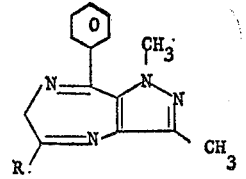

wherein R is $CH_3S-$ or $CH_3NH-$.

2. A compound of claim 1 said compound being 1,3-dimethyl-5-methylamino - 8 - phenylpyrazolo[4,3-e][1,4]diazepine.

3. A compound of claim 1 said compound being 1,3-dimethyl - 5 - methylmercapto-8-phenylpyrazolo[4,3-e][1,4]diazepine.

References Cited
UNITED STATES PATENTS

| | | | |
|---|---|---|---|
| 3,553,209 | 1/1971 | L'Italien et al. | 260—310 R |
| 3,553,210 | 1/1971 | Nordin | 260—310 R |
| 3,557,095 | 1/1971 | De Wald | 260—310 R |
| 3,558,605 | 1/1971 | De Wald et al. | 260—310 R |

NATALIE TROUSOF, Primary Examiner

U.S. Cl. X.R.

260—239.3 D; 424—273